Patented Jan. 24, 1950

2,495,270

UNITED STATES PATENT OFFICE 2,495,270

PHENOTHIAZINE DRENCH COMPOSITIONS

Clarence A. Littler, Maple Heights, Ohio, assignor to E. I. du Pont de Nemours & Company, Wilmington, Del., a corporation of Delaware No Drawing. Application February 21, 1945, Serial No. 579,165

6 Claims. (Cl. 167—53)

This invention relates to compositions of matter readily dispersible in water to give suspensions useful for pest control, and is more particularly directed to mixtures comprising a major proportion of phenothiazine containing diphenylamine and minor proportions of a non-ionic, monomeric, long-chain aliphatic, monohydroxy organic compound, and a non-ionic, high molecular weight, water-soluble, polyhydroxylic polymer.

Phenothiazine has been found to be a highly effective agent for the control of insect pests. For instance, it has been used to control codling moth on apples, and as an anthelmintic for controlling worms in sheep, cattle, horses, and other animals. In such uses the phenothiazine is frequently applied in the form of an aqueous suspension.

Unfortunately, certain commercially available grades of phenothiazine, which contain diphenylamine, do not readily disperse in water to make suspensions of the desired character. In using phenothiazine as an anthelmintic it is often the practice to administer it internally as a "drench," that is, as a relatively concentrated aqueous suspension. To keep the amount of liquid so injected to a minimum it is necessary that a suspension contain a relatively large proportion of active ingredients. Thus it is desirable that anthelmintic drenches should contain about 40% or more of phenothiazine.

The preparation of an anthelmintic drench containing 40% or more of phenothiazine has hitherto been a difficult matter for the average rancher, whose mixing equipment might be no more than a barrel and a stirring paddle. To such a user it is highly important that the phenothiazine be readily dispersible and easily suspendable. Moreover, his problem is not merely one of obtaining dispersion and suspension of the phenothiazine. The suspension obtained must be sufficiently thin and fluid to permit its use in the usual equipment available for dosing animals.

The problem here presented is not merely to wet the phenothiazine. Phenothiazine compositions which are readily wettable have already been disclosed, as for instance in Flenner Patent 2,161,462, but when a drench containing 40% or more of such a wettable product is made up it may be found to be too thick to be used.

A drench which is thin enough and fluid enough to be used may, on the other hand, be unsatisfactory due to rapid settling out of the active ingredients. Rapid settling causes non-uniformity and makes it impossible for the user to know when a proper dosage of the active ingredient has been administered. It is therefore essential that a drench-grade phenothiazine be capable of remaining suspended relatively uniformly in the aqueous medium.

The problem of producing a satisfactory drench-grade phenothiazine is further complicated by the fact that many agents which are effective with relatively pure phenothiazine have little or no effectiveness with certain commercial grades of phenothiazine containing diphenylamine. Unfortunately, purified grades of phenothiazine are available only at extra cost. The amount of diphenylamine ordinarily present in commercial grades of phenothiazine is not large enough to have any appreciable effect on the usefulness of the phenothiazine as an anthelmintic, but even small amounts of diphenylamine seriously complicate the problem of producing a suitable drench.

Now according to the present invention it has been found that by mixing phenothiazine containing diphenylamine with minor proportions of a non-ionic, monomeric, long-chain aliphatic, monohydroxy organic compound, and of a non-ionic, high molecular weight, water-soluble, polyhydroxylic polymer, products are produced which in powdered form are readily dispersible in water to give suspensions which are relatively fluid even at high concentration and from which the phenothiazine does not settle out rapidly. Such compositions may be easily used in relatively simple equipment to give highly satisfactory anthelmintic drenches.

The compositions of this invention are in the form of powdered mixtures. In general it will be found that the more finely divided the powder is, the more permanent and uniform will be the aqueous suspension produced therefrom. The components may be mixed and the mixture subjected to grinding, as in a micro-pulverizer, or the components may be independently reduced to a fine state of subdivision and then mixed by any suitable means.

The phenothiazine used may contain from a fraction of a percent up to several percent by weight of diphenylamine. The advantages of the invention will be most apparent when the diphenylamine content is relatively large as, for instance, 5%, but significant advantages are obtained when the diphenylamine content is as little as .05% by weight, based on the phenothiazine. Ordinarily the diphenylamine content will not exceed about 1.0% since the diphenylamine contributes nothing to the effectiveness of the compound, is a relatively expensive impurity, and is readily convertible to phenothiazine in the usual processes of manufacture of that active ingredient.

The monohydroxy organic compounds which may be used in a composition of this invention are all alcohols and all contain a long-chain, aliphatic group, but it is not necessary that the hydroxyl of the alcohol be directly connected to the long-chain group. Esters or ethers of polyhydric alcohols in which all except one of the hydroxyls have been esterified or etherified may be employed to advantage. Thus, the dioctyl ether of glycerol, which may be used, is an alcohol but the hydroxyl of the alcohol is not on the long-chain octyl group.

The term "long-chain aliphatic" will be understood to refer to a group containing a considerable number of carbon atoms as a chain, although there may, of course, be side chains of alkyl or aryl groups or other substituent atoms. The long chain may contain from 8 to 14 carbon atoms. The organic compound should be monomeric and it should be non-ionic, that is, when added to water it should form neither cations or anions. Representative of monohydroxy organic compounds which may be used are octyl alcohol, decyl alcohol, dodecyl alcohol, tetradecyl alcohol, propylene glycol monolaurate, and ethylene glycol monooleate. A mixture of alcohols, such as is obtained by the hydrogenation of coconut oil acids and sometimes known as technical dodecyl alcohol, consisting predominately of dodecyl alcohol and containing minor amounts of octyl, decyl, and tetradecyl alcohols, may be used to advantage.

The amount of monohydroxy organic compound employed should constitute a minor proportion of the total weight of the drench-grade mixture. More particularly, excellent results will be obtained using about from 0.25 to 1.0% of monohydroxy compound, and specifically, about 0.5% of technical dodecyl alcohol may be used in a preferred formulation. It will be understood that here and elsewhere in the description of this invention the percentages shown refer to percentage by weight based on the total weight of dry mixture, unless otherwise specified.

The polymer used in a composition of this invention should be non-amylaceous organic polyhydroxylic material, that is, it should contain a multiplicity of hydroxyl groups attached to carbon atoms. The polymers should be water-soluble and they should have high molecular weight, that is, a molecular weight substantially in excess of 5000, and they should be non-ionic.

Representative of the polymers which may be used are methyl cellulose and polyvinyl alcohol. The methyl cellulose should not, of course, be so highly methylated that no hydroxyl groups remain.

The polyvinyl alcohol, which represents a preferred agent of the invention, may be such as is obtained by the hydrolysis of polyvinyl acetate. To gain the necessary water solubility the degree of hydrolysis of the acetate should preferably be greater than 50% but it should be understood that complete hydrolysis is not essential and that there may be present in the polyvinyl alcohol residual acetate groups, say to the extent of 20 to 25% of the original number of such groups. The degree of polymerization of the polyvinyl alcohol should not be so great as to interfere with the cold water-solubility of the material. A product prepared by hydrolyzing polyvinyl acetate to the extent of 90%, and having an average molecular weight of about 15,000 may be used to especial advantage.

The polyhydroxylic polymer should constitute a minor proportion of the total phenothiazine composition. More particularly it should be present in the proportion of about from 0.25 to 1.0%. Especially good results are obtained using about 0.4%.

In a preferred embodiment of the invention there may be included a stabilizer such as algin. Such a stabilizer should be present as a minor proportion of the total composition, excellent results being derived from using from 0.1 to 1.0%. In a particularly preferred composition 0.25% of algin may be used.

When the compositions of this invention are to be used with waters which are very hard, that is, containing more than about 300 parts per million of hardness, important advantages may be derived by the inclusion of a minor proportion of tetrasodium pyrophosphate. When used the pyrophosphate may constitute from about 0.05% to 1.0% of the composition.

The compositions of this invention are useful in making aqueous suspensions of phenothiazine for pest control purposes. More particularly, they are useful for making anthelmintic drenches containing substantial proportions, say 40% or more, of phenothiazine in water. Where the compositions are intended for ultimate internal use in warm blooded animals caution should of course be exercised to be sure that the agents employed are non-toxic to such animals in the dosage ultimately involved.

The nature of this invention will be better understood by reference to the following illustrative examples:

*Example I*

A composition of this invention was made up by intimately mixing, through grinding in a mortar, the following constituents in the indicated proportions by weight.

| | Percent |
|---|---|
| Phenothiazine, containing 0.45% diphenylamine | 98.85 |
| Technical dodecyl alcohol | 0.50 |
| Cold water soluble, low viscosity type polyvinyl alcohol (87.7% hydrolyzed polyvinyl acetate, viscosity=5 cp. at 20° C.) in 4% solution | 0.40 |
| Algin | 0.25 |

The resultant product was a powder which was found to be readily dispersible in water to give a uniform, fluid, pourable, smooth suspension containing 40% by weight of phenothiazine and ideally adapted for use as an anthelmintic drench.

Further examples of compositions of this invention are given below. The compositions were made by intimately mixing the indicated constituents, the percentages being by weight. In each instance the resultant product was a powder readily dispersible in water to give a uniform, fluid, pourable, smooth suspension containing 40% by weight of phenothiazine. The suspension so obtained had the physical characteristics highly desirable in an anthelmintic drench.

*Example II*

| | Percent |
|---|---|
| Phenothiazine containing 0.92% diphenylamine | 99.05 |
| Technical dodecyl alcohol | 0.50 |
| Cold water soluble, low viscosity type polyvinyl alcohol | 0.20 |

Example III

| | Percent |
|---|---|
| Phenothiazine containing 0.92% diphenylamine | 99.00 |
| Technical dodecyl alcohol | 0.50 |
| Cold water soluble, medium viscosity type polyvinyl alcohol | 0.50 |

Example IV

| | Percent |
|---|---|
| Phenothiazine containing 0.92% diphenylamine | 98.60 |
| Technical dodecyl alcohol | 0.50 |
| Cold water soluble, low viscosity type polyvinyl alcohol | 0.50 |
| Karaya gum | 0.40 |

Example V

| | Percent |
|---|---|
| Phenothiazine containing 0.92% diphenylamine | 98.75 |
| Technical dodecyl alcohol | 0.50 |
| Cold water soluble, low viscosity type methyl cellulose | 0.50 |
| Algin | 0.25 |

Example VI

| | Percent |
|---|---|
| Phenothiazine containing 0.92% diphenylamine | 98.55 |
| Propylene glycol monolaurate | 0.60 |
| Cold water soluble, high viscosity type polyvinyl alcohol | 0.70 |
| Algin | 0.15 |

Example VII

| | Percent |
|---|---|
| Phenothiazine containing 0.40% diphenylamine | 98.20 |
| Propylene glycol monolaurate | 0.80 |
| Cold water soluble, low viscosity type polyvinyl alcohol | 0.70 |
| Algin | 0.20 |
| Tetrasodium pyrophosphate | 0.10 |

Example VIII

| | Percent |
|---|---|
| Phenothiazine containing .36% diphenylamine | 98.85 |
| Octyl alcohol | 0.50 |
| Cold water soluble, low viscosity type polyvinyl alcohol | 0.40 |
| Algin | 0.25 |

Example IX

| | Percent |
|---|---|
| Phenothiazine containing 0.36% diphenylamine | 98.90 |
| Technical dodecyl alcohol | 0.50 |
| Cold water soluble, medium viscosity type methyl cellulose | 0.60 |

Example X

| | Percent |
|---|---|
| Phenothiazine containing 0.36% diphenylamine | 90.290 |
| Technical dodecyl alcohol | 0.458 |
| 10% aqueous solution of medium viscosity hydroxyethyl cellulose | 9.252 |

While in the foregoing description of the invention there have been shown certain specific compositions it will be understood that without departing from the spirit of the invention one skilled in the art may produce numerous compositions.

I claim:

1. A composition in the form of a powdered mixture readily dispersible in water and adapted for the preparation of an anthelmintic drench, the composition comprising a major proportion of phenothiazine containing diphenylamine and minor proportions of a monomeric non-ionic, monohydroxy aliphatic alcohol containing from 8 to 14 carbon atoms, and of a non-amylaceous, non-ionic, high molecular weight in excess of 5000, water-soluble, polyhydroxylic polymer selected from polyvinyl alcohol and methyl cellulose.

2. A composition in the form of a powdered mixture readily dispersible in water and adapted for the preparation of an anthelmintic drench, the composition comprising a major proportion of phenothiazine containing diphenylamine and minor proportions of an aliphatic alcohol containing from 8 to 14 carbon atoms, and of a water-soluble polyvinyl alcohol.

3. A composition in the form of a powdered mixture readily dispersible in water and adapted for the preparation of an anthelmintic drench, the composition comprising a major proportion of phenothiazine containing diphenylamine and minor proportions of an aliphatic alcohol containing from 8 to 14 carbon atoms, and of a water-soluble methyl cellulose.

4. A composition in the form of a powdered mixture readily dispersible in water and adapted for the preparation of an anthelmintic drench, the composition comprising phenothiazine containing diphenylamine, about from 0.1 to 1.0% by weight of technical dodecyl alcohol, and about from 0.1 to 1.0% by weight of a water-soluble polyvinyl alcohol.

5. A composition in the form of a powdered mixture readily dispersible in water and adapted for the preparation of an anthelmintic drench, the composition comprising phenothiazine containing diphenylamine, about from 0.1 to 1.0% by weight of propylene glycol monolaurate, and about from 0.1 to 1.0% by weight of a water-soluble polyvinyl alcohol.

6. A composition in the form of a powdered mixture readily dispersible in water and adapted for the preparation of an anthelmintic drench, the composition comprising by weight, about 0.25% algin, 0.40% cold water-soluble, low viscosity type polyvinyl alcohol, 0.50% technical dodecyl alcohol, and 98.85% of phenothiazine containing about 0.45% diphenylamine.

CLARENCE A. LITTLER.

REFERENCES CITED

The following references are of record in the file of this patent:

UNITED STATES PATENTS

| Number | Name | Date |
|---|---|---|
| 1,629,161 | Herrmann | May 17, 1927 |
| 2,047,220 | Patterson et al. | July 14, 1936 |
| 2,098,836 | Ressler | Nov. 9, 1937 |
| 2,161,462 | Flenner | June 6, 1939 |
| 2,217,566 | Smith | Oct. 8, 1940 |
| 2,236,545 | Maxwell et al. | Apr. 1, 1941 |
| 2,262,454 | Flenner | Nov. 11, 1941 |
| 2,294,888 | Austin | Sept. 8, 1942 |
| 2,407,486 | Flenner et al. | Sept. 10, 1946 |

OTHER REFERENCES

Foster et al., Phenothiazine for the Control of Parasites of Farm Animals, U. S. Dept. of Agriculture, Oct. 1943, page 2. (Copy in Division 43.)

Dawsey, Circular No. 568, U. S. D. A., June 1940, "Use of Some Common Insecticide-Dispersing Agents," page 5. (Copy in Division 43.)

Journal of Econ. Entomology, vol. 32, No. 5, Oct. 1939, pages 704 and 705, by Bruce. (Copy in Division 63.)